(12) United States Patent
Kim

(10) Patent No.: US 12,476,319 B2
(45) Date of Patent: Nov. 18, 2025

(54) BATTERY MODULE INCLUDING ECCENTRIC MEMBER

(71) Applicant: LG Energy Solution, Ltd., Seoul (KR)

(72) Inventor: Tae Wook Kim, Daejeon (KR)

(73) Assignee: LG Energy Solution, LTD., Seoul (KR)

( * ) Notice: Subject to any disclaimer, the term of this patent is extended or adjusted under 35 U.S.C. 154(b) by 504 days.

(21) Appl. No.: 17/923,896

(22) PCT Filed: Jan. 4, 2022

(86) PCT No.: PCT/KR2022/000080
§ 371 (c)(1),
(2) Date: Nov. 7, 2022

(87) PCT Pub. No.: WO2022/154350
PCT Pub. Date: Jul. 21, 2022

(65) Prior Publication Data
US 2023/0352793 A1    Nov. 2, 2023

(30) Foreign Application Priority Data

Jan. 12, 2021 (KR) .................. 10-2021-0004087

(51) Int. Cl.
*H01M 50/262*    (2021.01)
*H01M 50/211*    (2021.01)
*H01M 50/244*    (2021.01)
*H01M 50/249*    (2021.01)

(52) U.S. Cl.
CPC ....... *H01M 50/262* (2021.01); *H01M 50/211* (2021.01); *H01M 50/244* (2021.01); *H01M 50/249* (2021.01); *H01M 2220/20* (2013.01)

(58) Field of Classification Search
CPC ............ H01M 50/262; H01M 50/264; H01M 50/267; H01M 50/249; H01M 50/211; H01M 50/207; H01M 50/233; H01M 50/244; H01M 2220/20
See application file for complete search history.

(56) References Cited

U.S. PATENT DOCUMENTS

| | | |
|---|---|---|
| 2012/0313559 A1 | 12/2012 | Tonomura et al. |
| 2013/0177793 A1 | 7/2013 | Seki |
| 2013/0236751 A1 | 9/2013 | Seong et al. |
| 2017/0141367 A1 | 5/2017 | Kim et al. |
| 2018/0053921 A1 | 2/2018 | Kim et al. |
| 2020/0365849 A1 | 11/2020 | Park |
| 2021/0194101 A1 | 6/2021 | Kim et al. |

(Continued)

FOREIGN PATENT DOCUMENTS

| | | |
|---|---|---|
| CN | 203114822 U | 8/2013 |
| CN | 204905323 U | 12/2015 |

(Continued)

*Primary Examiner* — Raymond Alejandro
(74) *Attorney, Agent, or Firm* — Bryan Cave Leighton Paisner LLP

(57) ABSTRACT

A battery module including an eccentric member, and more particularly a battery module including a cell stack including one or more battery cells, a frame (housing the cell stack, a pair of end plates covering opposite end surfaces of the cell stack, and a plurality of eccentric members disposed adjacent to vertical edges of opposite ends of each of the pair of end plates.

10 Claims, 7 Drawing Sheets

(56) References Cited

U.S. PATENT DOCUMENTS

| | | | |
|---|---|---|---|
| 2021/0265705 A1 | 8/2021 | Min et al. | |
| 2021/0344074 A1 | 11/2021 | Jung et al. | |
| 2021/0384527 A1* | 12/2021 | Greszler | ............... H01M 4/583 |
| 2022/0247023 A1 | 8/2022 | Morisaku et al. | |

FOREIGN PATENT DOCUMENTS

| | | |
|---|---|---|
| CN | 209447885 U | 9/2019 |
| CN | 111279515 | 6/2020 |
| JP | 2006-185737 A | 7/2006 |
| JP | 2012256521 A | 12/2012 |
| JP | 2015-011819 A | 1/2015 |
| JP | 2015-187911 A | 10/2015 |
| JP | 2018181734 A | 11/2018 |
| JP | 2020-140762 A | 9/2020 |
| JP | 4858660 B | 1/2023 |
| KR | 10-2012-0055451 A | 5/2012 |
| KR | 10-2014-0048561 A | 4/2014 |
| KR | 10-2016-0129597 A | 11/2016 |
| KR | 10-2017-0053429 A | 5/2017 |
| KR | 10-2017-0056973 A | 5/2017 |
| KR | 10-2017-0096439 A | 8/2017 |
| KR | 10-2019-0002025 A | 1/2019 |
| KR | 10-2020-0102292 A | 8/2020 |
| KR | 10-2020-0131022 A | 11/2020 |
| WO | 2020241585 | 3/2020 |
| WO | 2020-175881 A1 | 9/2020 |

\* cited by examiner

[FIG. 1]
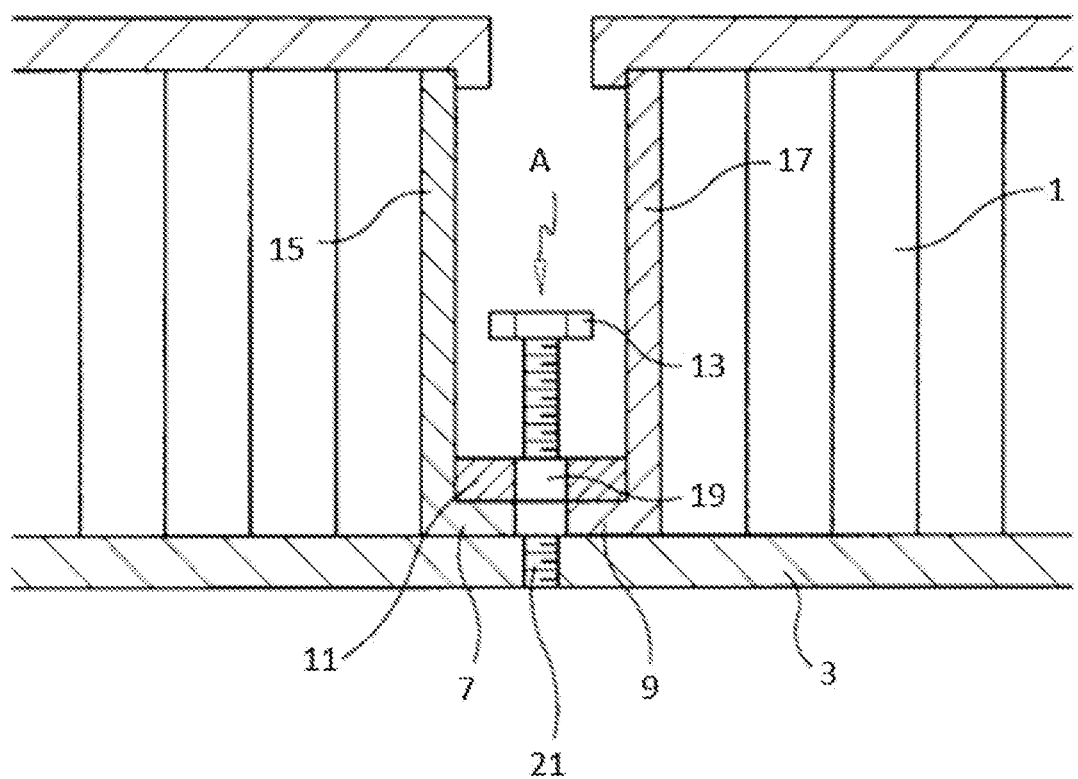

[FIG. 2]
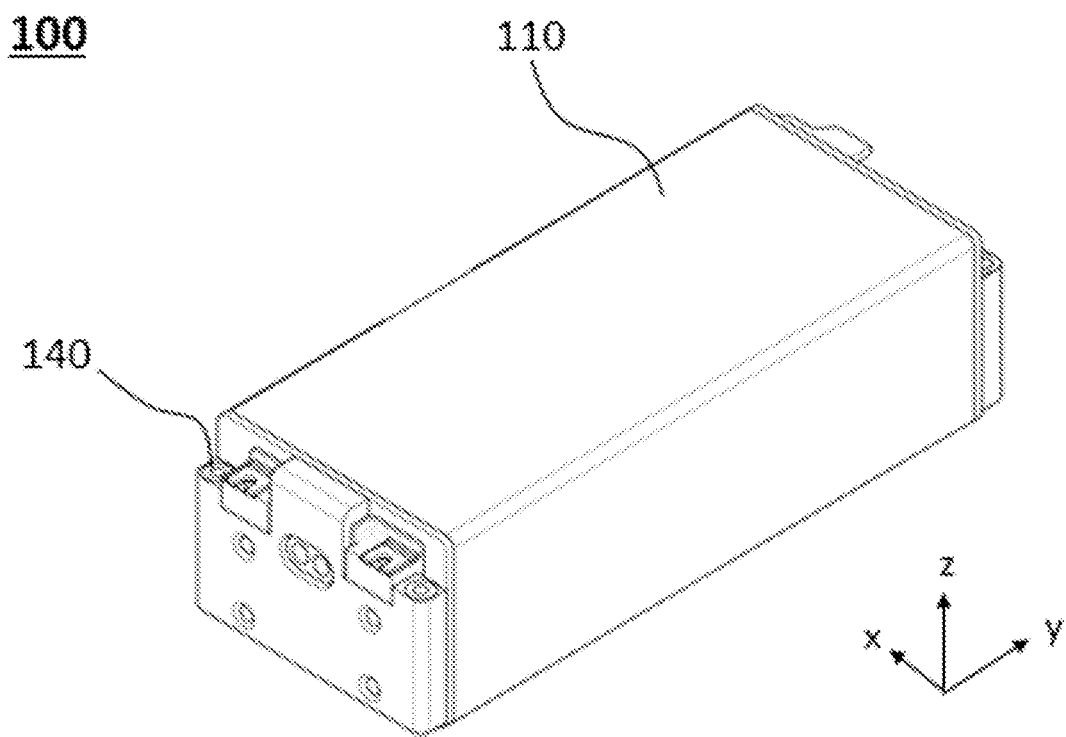

[FIG. 3]
100
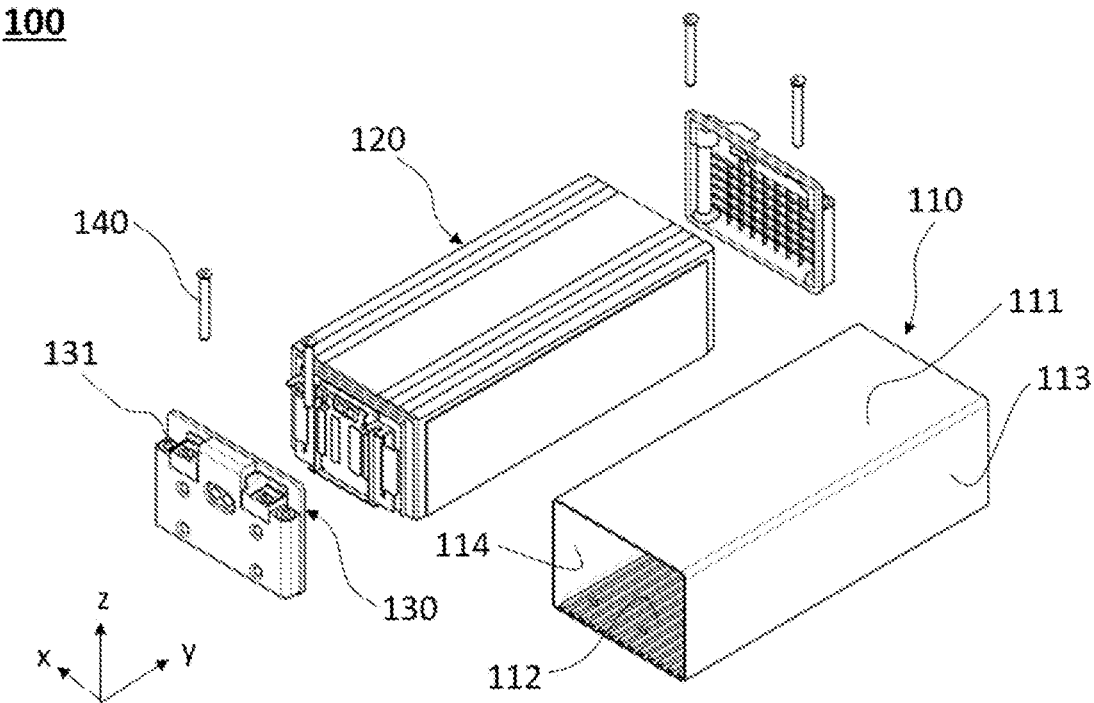

[FIG. 4]
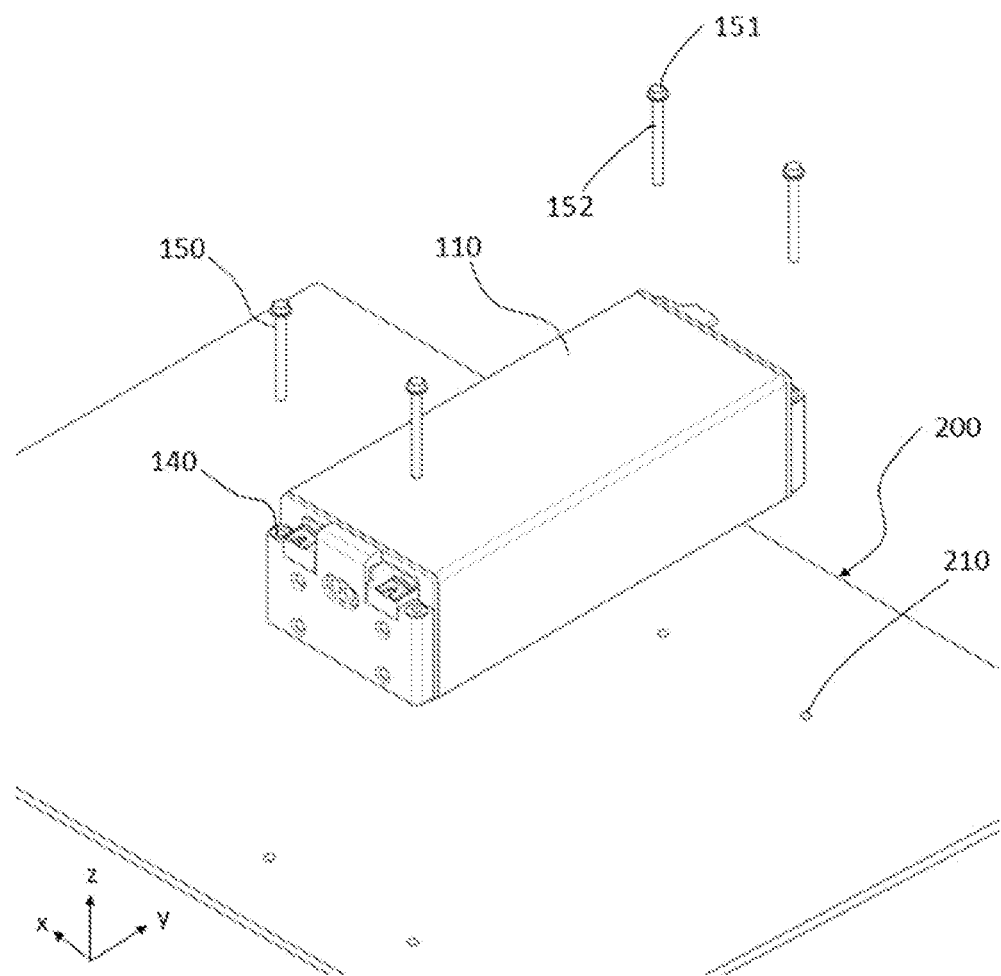

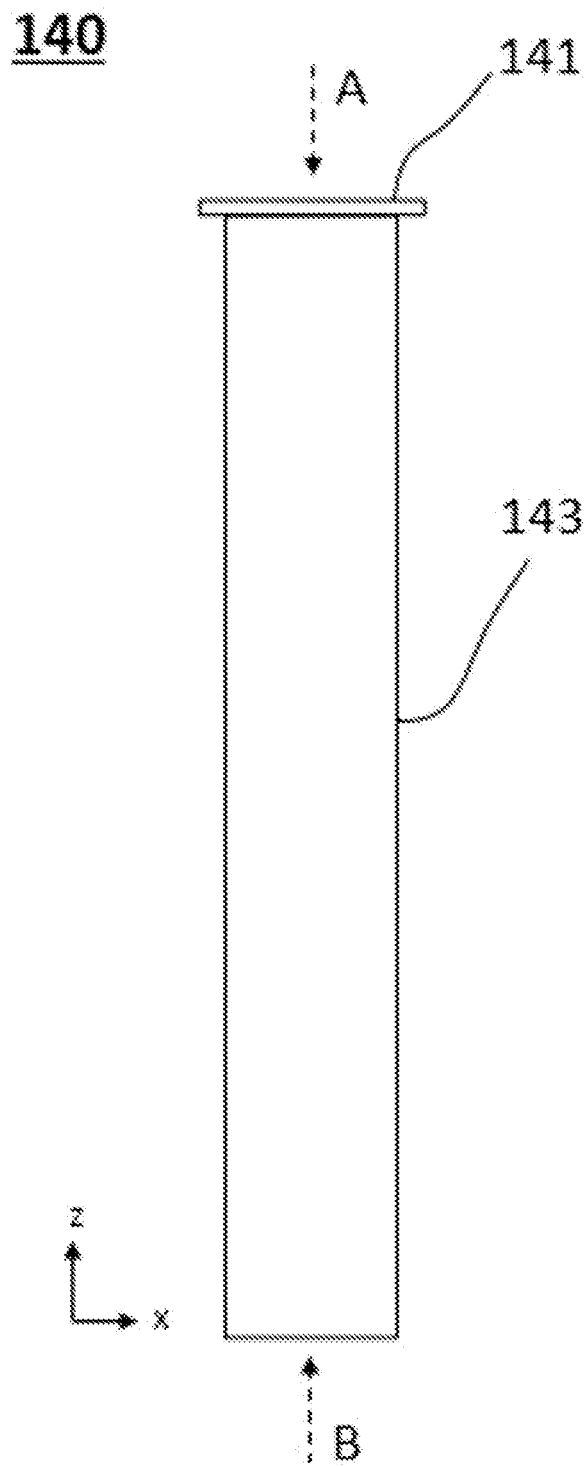
[FIG. 5]

【FIG. 6A】
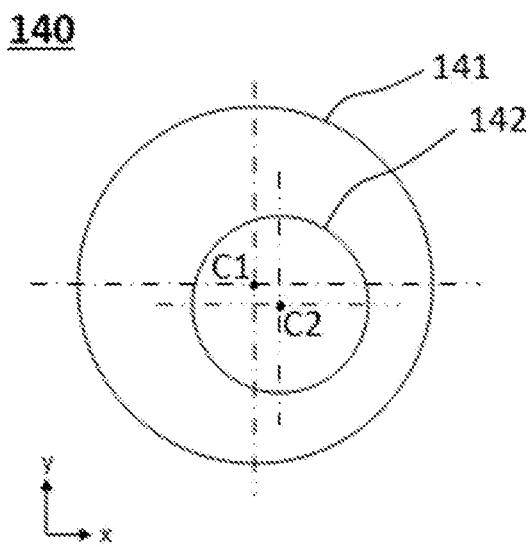
【FIG. 6B】
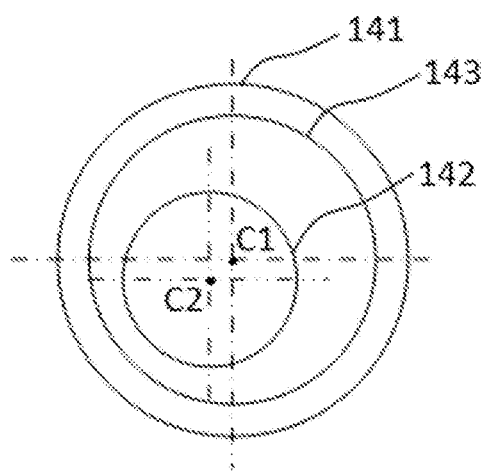

[FIG. 7]
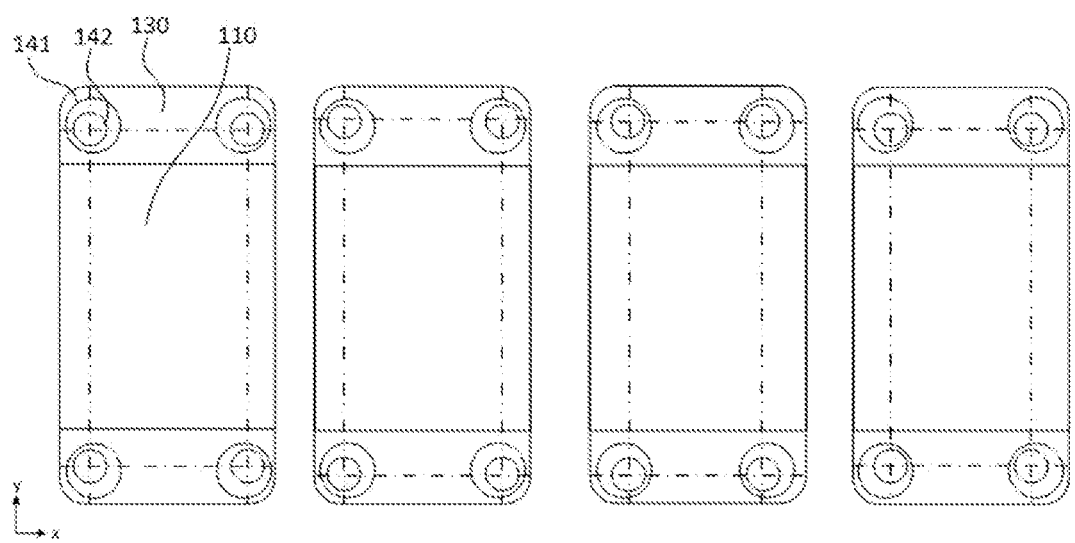

BATTERY MODULE INCLUDING ECCENTRIC MEMBER

CROSS-REFERENCE TO RELATED APPLICATIONS

This application is a US national phase of international Application No. PCT/KR2022/000080 filed Jan. 4, 2022, and claims the benefit of priority to Korean Patent Application No. 2021-0004087 filed on Jan. 12, 2021, the disclosures of which are incorporated herein by reference in their entirety.

TECHNICAL FIELD

The present invention relates to a battery module including an eccentric member. More particularly, the present invention relates to a battery module including an eccentric member configured such that the eccentric member, which is provided with an eccentric hole, is disposed at an end plate of the battery module to change a mounting position.

BACKGROUND

With an increase in demand for mobile devices, such as smartphones, demand for batteries used as energy sources thereof has also increased. In addition, batteries are used in an electric vehicle (EV), a hybrid electric vehicle (HEV), a plug-in hybrid electric vehicle (P-HEV), an energy storage system (ESS), and the like.

For small mobile devices, one battery cell or two or three battery cells are used per device, whereas, for medium or large devices, such as a vehicle, a battery module including a plurality of battery cells electrically connected to each other er used because high output and large capacity is necessary.

A prismatic battery or a pouch-shaped battery, which is capable of being charged with high integration and has a small capacity, is mainly used as a battery cell for battery modules. In particular, much interest is currently focused on a pouch-shaped battery that uses an aluminum laminate sheet as a sheathing member because such a pouch-shaped battery is lightweight, the cost of manufacturing the pouch-shaped battery is low, and the pouch-shaped battery is easily deformable.

Also, a plurality of battery cells must be electrically connected to each other in series or in parallel for the battery module to provide output and capacity required by a device, and the battery module must be stably coupled to the device such that the structure of the battery module is stably maintained.

FIG. 1 is an illustration of a battery module mounting structure for electric vehicles that securely mounts a conventional battery module to a battery tray. As illustrated in FIG. 1, the battery module mounting structure includes flanges 7 and 9, a stopper 11, and a bolt 13 to mount the battery module 1 to a battery tray floor 3. The flanges 7 and 9 are formed at lower ends of end plates 15 and 17 of the battery module 1 disposed opposite each other in a horizontal direction, i.e. in parallel to the battery tray floor 3. The flanges 7 and 9 are spaced apart from each other such that the bolt 13 is inserted between tip ends thereof, and the stopper 11 is formed to have a size capable of simultaneously supporting the flanges 7 and 9 such that the flanges 7 and 9 can be fixed using one bolt 13, and is provided with a through-hole 19, through which the bolt 13 extends. A fastening hole 21, to which the tip end of the bolt 13 that has extended through the through-hole 19 of the stopper 11 and between the flanges 7 and 9 is fastened, is formed in the battery tray floor 3 opposite the through-hole 19. The stopper 11 is located on the flanges 7 and 9 of the end plates 15 and 17, and the bolt 13 extends through the through-hole 19 formed in the stopper 11 and is fastened to the fastening hole 21, whereby the battery module 1 is securely fixed to the battery tray floor 3. For the battery tray floor of the conventional device, the position of the fastening hole 21 is changed for respective customers, and therefore the mounting position of the battery module must be differently designed and manufactured based on characteristics of customer-specific devices.

As described in Patent Document 1, a battery tray for vehicles that is interposed between a vehicle battery and a bracket configured to fix the vehicle battery to a mission mount; however, there is a disadvantage in that the bracket configured to fix the battery to the mission mount is separately manufactured and coupled to the mission mount, whereby the structure and manufacturing process are complicated.

Patent Document 1—Korean Patent Application Publication No. 2019-0002025

SUMMARY

The present invention has been made in view of the above problems, and it is an objective of the present invention to provide a battery module including an eccentric member capable of being coupled to various standards of mission mounts while a conventional battery module is used without change.

It is another objective of the present invention to provide a battery module having a novel fastening structure, whereby a process of assembling the battery module and a mission mount is simplified while assembling efficiency is improved.

In order to accomplish the above objectives, a battery module according to the present invention includes a cell stack (120) including a cell stack including one or more stacked battery cells, a frame (110 configured to receive the cell stack (120) therein, and a pair of end plates (130) configured to cover opposite end surfaces of the cell stack (120), wherein eccentric members (140) are disposed adjacent to the vertical edges (z-axis direction) of opposite ends of the pair of end plates (130).

In the battery module according to the present invention, the eccentric members (140) may be inserted into through-holes (131) formed in the end plates (130).

Also, in the battery module according to the present invention, each of the eccentric members (140) may include a flange portion (141) and a body portion (143), and an eccentric hole (142) may be formed through the flange portion (141) and the body portion (143).

Also, in the battery module according to the present invention, the flange portion (141) and the body portion (143) may be centered on the same point on the xy plane, and the eccentric hole (142) may be centered on a point on the xy plane that is spaced apart from the center of the flange portion (141) and the body portion (143).

Also, in the battery module according to the present invention, a fastening member (150) may be inserted into the eccentric hole (142) so as to be coupled to a battery module mount.

Also, in the battery module according to the present invention, the fastening member (150) may include a fastening member cap portion (151) and a fastening member body portion (152), and the cap portion may be supported by the flange portion (141) of the eccentric member (140).

Also, in the battery module according to the present invention, each of the eccentric members (140) may be made of an insulating material.

Also, in the battery module according to the present invention, each of the battery cells may be a pouch-shaped battery cell.

Also, in the battery module according to the present invention, each of the pair of end plates (130) may be located outside the frame (110).

The present invention provides a battery pack including the battery module and a device including the battery pack.

In the present invention, one or more constructions that do not conflict with each other may be selected and combined from among the above constructions.

In a battery module according to the present invention, an eccentric member is disposed at an end plate, whereby it is possible to couple a conventional battery module to various standards of mission mounts without change, and therefore it is not necessary to change a battery module production process, which is economically advantageous.

Since the eccentric member according to the present invention is applicable to conventional fastening members without change, new parts are unnecessary, which is economically advantageous.

BRIEF DESCRIPTION OF DRAWINGS

FIG. 1 is a schematic view of a conventional battery module fastened to a mission mount.

FIG. 2 is a schematic view of a battery module according to an embodiment of the present invention.

FIG. 3 is an exploded perspective view of the battery module of FIG. 2.

FIG. 4 is a schematic view of a fastening member coupled to the battery module according to the present invention.

FIG. 5 is a front view of an eccentric member according to an embodiment of the present invention.

FIG. 6A is a sectional view of the eccentric member when viewed in direction A of FIG. 5 and FIG. 6B is a sectional view of the eccentric member when viewed in a direction B of FIG. 5.

FIG. 7 is a schematic view of mounting positions depending on the position of eccentric holes in the eccentric member according to the present invention.

DETAILED DESCRIPTION

In the present application, it should be understood that the terms "comprises," "has," "includes," and the like, specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery module according to the present invention will be described with reference to the accompanying drawings.

FIG. 2 is a schematic view of a battery module according to an embodiment of the present invention, FIG. 3 is an exploded perspective view of the battery module shown in FIG. 2, and FIG. 4 is a schematic view of a fastening member coupled to the battery module according to the present invention.

As illustrated in FIGS. 2 and 3, the battery module 100, which has an approximately hexahedral outer shape, according to the embodiment of the present invention may include a cell stack 120 disposed in a frame 110 having a quadrangular column shape and a pair of end plates 130 disposed respectively at opposite open ends of the frame 110.

In the present invention, the frame 110 includes an upper cover 111, a lower cover 112 disposed to face the upper cover 111 and a mission mount (not shown), and a first side cover 113 and a second side cover 114 located to face each other in a parallel direction between the upper cover 111 and the lower cover 112. Sides of the four covers in a longitudinal direction (y-axis direction) are connected to each other to constitute a quadrangular column shape, and openings are formed at opposite ends of the four covers in the longitudinal direction.

The four covers may be individually manufactured and may then be assembled to each other. Alternatively, some or all of the covers may be integrally formed as needed.

In the present invention, the cell stack 120 is configured such that a plurality of battery cells is stacked such that wide surfaces of the battery cells are in tight contact with each other, and each of the battery cells includes a cell case (not shown) configured to receive an electrode assembly (not shown) and electrode leads (not shown).

The cell case is a pouch-shaped cell case (made of a laminate sheet), wherein at least one electrode assembly is received in a receiving portion, and an edge of the receiving portion is fused, whereby the receiving portion is hermetically sealed, and a pair of electrode leads is connected to opposite sides or one side of the electrode assembly and protrudes outwards from the cell case. Of course, positive electrode tabs and negative electrode tabs of the electrode assembly may be electrically connected to the electrode assembly, respectively, and may be exposed outwards from the cell case, or the electrode leads may be directly connected to the electrode assembly without tabs.

The electrode assembly may be a jelly-roll type electrode assembly, which is configured to have a structure in which a long sheet type positive electrode and a long sheet type negative electrode are wound in the state in which a separator is interposed therebetween; a stacked type electrode assembly, which is configured to have a structure in which a rectangular positive electrode and a rectangular negative electrode are stacked in the state in which a separator is interposed therebetween; a stacked and folded type electrode assembly, which is configured to have a structure in which unit cells are wound using a long separation film; or a laminated and stacked type electrode assembly, which is configured to have a structure in which battery cells are stacked such that a separator is interposed therebetween and are then attached to each other. However, the present invention is not limited thereto.

It is obvious that an electrolyte in the battery cell may be replaced by a solid electrolyte or a gel type quasi-solid electrolyte obtained by adding an additive to a solid electrolyte, the gel type quasi-solid electrolyte having an intermediate phase between a liquid and a solid, in addition to a liquid electrolyte, which is commonly used.

The electrode assembly is received in the cell case, and the cell case is generally configured to have a laminate sheet structure including an inner layer, a metal layer, and an outer layer. The inner layer is disposed in direct contact with the electrode assembly, and therefore the inner layer must exhibit high insulation properties and high resistance to an electrolytic solution. In addition, the inner layer must exhibit high sealability to hermetically seal the cell case from the outside, i.e. a thermally-bonded sealed portion between inner layers must exhibit excellent thermal bonding strength. The inner layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability. However, the present invention is not limited thereto, and polypropylene, which exhibits excellent mechanical-physical properties, such as tensile strength, rigidity, surface hardness, and impact resistance, and excellent chemical resistance, is the most preferably used.

The metal layer, which is disposed to abut the inner layer, corresponds to a barrier layer configured to prevent moisture or various kinds of gas from permeating into the battery from the outside. An aluminum thin film, which is lightweight and easily shapeable, may be used as a preferred material for the metal layer.

The outer layer is provided on a surface of the metal layer opposite to a surface that abuts the inner layer. The outer layer may be made of a heat-resistant polymer that exhibits excellent tensile strength, resistance to moisture permeation, and resistance to air transmission such that the outer layer exhibits high heat resistance and chemical resistance while protecting the electrode assembly. As an example, the outer layer may be made of nylon or polyethylene terephthalate. However, the present invention is not limited thereto.

In addition, a busbar frame (not shown) may be located at the side surface of the cell stack 120 in a direction in which electrode leads of the electrode assembly extend, and a busbar may be fixed to the busbar frame such that the busbar faces outwards. The electrode leads of the electrode assembly may be electrically connected to the busbar through a slit formed in the busbar frame.

In the present invention, the end plate 130 may be located outside a busbar assembly including the busbar frame and the busbar of the cell stack 120. In addition, an insulation cover may be located between the end plate 130 and the busbar assembly, and the insulation cover and the end plate 130 may be manufactured and coupled to each other. The end plate 130 and the busbar assembly may be coupled to each other through a coupling member (not shown).

Each of the pair of end plates 130 may be provided with a pair of through-holes 131 adjacent to the vertical edges (z-axis direction) of opposite ends of the pair of end plates 130 in a height direction (z-axis direction) that face the first side cover 113 and the second side cover 114 of the frame 110. The through-holes 131 may be formed over the entire height of the end plate 130 while being parallel to the edges of the end plate, or may be formed at a predetermined height while being parallel to the edges of the end plate. An eccentric member 140 may be inserted into a vertical inner hole of each of the through-holes 131.

As illustrated in FIG. 4, the fastening member 150 may include a cap portion (151) and a fastening member body portion (152) formed to extend from the cap portion 151 to one side. In the present invention, the diameter of the fastening member body portion 152 in the xy plane may be less than the diameter of the cap portion 151. Specifically, the fastening member body portion 152 may be inserted into an eccentric hole 142 of the eccentric member 140, a description of which will follow, and the cap portion 151 may be supported by a flange portion 141 of the eccentric member 140, a description of which will follow. The fastening member body portion 152 may extend through the eccentric hole 142 of the eccentric member 140, may extend through a through-hole shaped mounting position 210 formed in a mission mount 200, to which the battery module 100 according to the present invention will be mounted, from above, and may be fixed at a lower part of the mission mount 200 by a fixing member. Consequently, the battery module 100 may be stably mounted to an upper part of the mission mount 200. The fastening member 150 may be a bolt, and the fixing member may be a nut. Here, the mission mount 200 may be a battery tray of an electric vehicle or a mounting portion of a device to which the battery module is mounted. However, it is obvious that the mission mount is not particularly restricted.

FIG. 5 is a front view of an eccentric member according to an embodiment of the present invention, and FIG. 6 is a sectional view of the eccentric member shown in FIG. 5 when viewed in direction A and direction B. FIG. 6A is a sectional view of the eccentric member shown in FIG. 5 when viewed in direction A, and FIG. 6B is a sectional view of the eccentric member shown in FIG. 5 when viewed in direction B.

As illustrated in FIGS. 5 and 6, in the present invention, the eccentric member 140 may include a flange portion 141 located at an upper end and a body portion 143 formed to extend from the flange portion 141 to one side. Specifically, each of the flange portion and the body portion may have a circular cross-section. The circular flange portion 141 and the circular body portion 143 have the same center C1. A cylindrical eccentric hole 142 is formed through the flange portion 141 and the body portion 143 in a longitudinal direction (z-axis direction). The sectional center C2 of the eccentric hole 142 is spaced apart from the center C1 of the flange portion 141 and the body portion 143. The position of the center C2 of the eccentric hole 142 is not particularly restricted as long as the eccentric hole 142 can be formed in the body portion 143 and the fastening member 150 can extend into the eccentric hole.

In addition, the body portion 143 may be inserted into the through-hole 131 of the end plate 130, and the flange portion 141 may be supported by an extending horizontal surface (xy plane) of the edge of an upper end opening (not shown) of the through-hole 131.

In the present invention, the length of the body portion 143 of the eccentric member 140 is not particularly restricted as long as the fastening member 150 can extend through the eccentric hole 142 of the eccentric member 140 and the battery module 100 can be stably fixed to an upper end of the mission mount 200. The length (z-axis direction) of the body portion 143 may be equal to the depth (z-axis direction) of the through-hole 131. Specifically, the length of the body portion 143 may be less than the depth of the through-hole 131. It is possible to reduce production cost when the eccentric member 140 is manufactured such that the length of the body portion 143 is less than the depth of the through-hole 131.

In the present invention, specifically, the eccentric member 140 may be made of an insulating material, which is advantageous in the eccentric member being insulated from the busbar assembly located at the cell stack 120.

FIG. 7 is a schematic view of mounting positions depending on the position of the eccentric holes in the eccentric members according to the present invention.

As illustrated in FIG. 7, in the present invention, the eccentric members 140 may be inserted through the through-holes 131 formed adjacent to the vertical edges (z-axis direction) of opposite ends of the pair of end plates 130 and located to face each other. Consequently, the centers C2 of the eccentric holes 142 of the eccentric members 140 may be changed to be aligned with mounting positions 210 of various mission mounts 200.

The battery module according to the present invention described above is applicable to various kinds of devices or vehicles, such as an electric vehicle or a hybrid electric vehicle.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

The invention claimed is:

1. A battery module adapted to be mounted to a mission mount comprising:
   a cell stack comprising one or more battery cells;
   a frame housing the cell stack;
   a pair of end plates covering opposite end surfaces of the cell stack;
   a plurality of eccentric members adjacent to vertical edges at opposite ends of each of the pair of end plates, wherein each of the eccentric members comprises a body portion with an eccentric hole and,
   a fastening member, wherein the fastening member extends through the eccentric hole of the respective eccentric member to fix the battery module to the mission mount.

2. The battery module according to claim 1, wherein each of the plurality of eccentric members is in respective through-holes in each of the pair of end plates.

3. The battery module according to claim 1,
   wherein each of the plurality of eccentric members comprises a flange portion, and
   wherein the eccentric hole extends through the flange portion.

4. The battery module according to claim 3,
   wherein the flange portion and the body portion are centered at a common first point, and
   wherein the eccentric hole is centered at a second point that is spaced apart from the first point.

5. The battery module according to claim 3,
   wherein the fastening member comprises a cap portion, and
   wherein the cap portion is supported by the flange portion of the respective eccentric member of the plurality of eccentric members.

6. The battery module according to claim 1,
   wherein each of the plurality of eccentric members comprises an insulating material.

7. The battery module according to claim 1,
   wherein each of the one or more battery cells is a pouch-shaped battery cell.

8. The battery module according to claim 1,
   wherein each of the pair of end plates is located outside the frame.

9. A battery pack comprising the battery module according to claim 1.

10. A device comprising the battery pack according to claim 9.

* * * * *